(12) United States Patent
Wu et al.

(10) Patent No.: US 6,584,150 B1
(45) Date of Patent: Jun. 24, 2003

(54) DUAL DIRECTION CHANNEL ESTIMATOR

(75) Inventors: Jianjun Wu, Reading (GB); Abdol Hamid Aghvami, London (GB)

(73) Assignee: Kings College London, London (GB)

( * ) Notice: Subject to any disclaimer, the term of this patent is extended or adjusted under 35 U.S.C. 154(b) by 0 days.

(21) Appl. No.: 09/717,695

(22) Filed: Nov. 20, 2000

Related U.S. Application Data

(63) Continuation of application No. PCT/GB99/01589, filed on May 19, 1999.

(30) Foreign Application Priority Data

May 19, 1998 (GB) ............................................. 9810686

(51) Int. Cl.$^7$ ................................................ H03H 7/40
(52) U.S. Cl. ...................... 375/231; 375/324; 375/340; 708/305; 370/252; 370/321
(58) Field of Search ................... 375/231, 232, 375/262, 263, 267, 324, 340, 341, 342, 343; 708/322, 323, 305; 370/252, 321, 337, 347, 442

(56) References Cited

U.S. PATENT DOCUMENTS

| | | | | |
|---|---|---|---|---|
| 5,065,411 A | * | 11/1991 | Muto | 375/232 |
| 5,293,401 A | | 3/1994 | Serfaty | |
| 5,303,226 A | * | 4/1994 | Okanoue et al. | 370/442 |
| 5,633,860 A | * | 5/1997 | Hagmanns | 370/252 |
| 5,903,610 A | * | 5/1999 | Skold et al. | 375/285 |
| 5,995,499 A | * | 11/1999 | Hottinen et al. | 370/337 |
| 6,330,294 B1 | * | 12/2001 | Ansbro et al. | 375/229 |
| 6,418,175 B1 | * | 7/2002 | Pukkila et al. | 375/347 |

FOREIGN PATENT DOCUMENTS

| | | |
|---|---|---|
| EP | 0520969 | 6/1992 |
| FR | 2751815 | 7/1996 |

OTHER PUBLICATIONS

W. Liu et al., "Adaptive Channel Equalization for High–Speed Train," Proceedings of the Vehicular Technology Conference, Stockholm, vol. 1, No. Conf. 44, pp. 225–229 (1994).

Y. Liu et al., "A Soft–Output Bidirectional Decision Feedback Equalization Technique for TDMA Cellular Radio," IEEE Journal on Selected Areas in Communications, vol. 11, No. 7, pp. 1034–1045 (1993).

Wu et al., "A New Adaptive Equalizer with a Channel Estimator for Mobile Radio Communications," Proceedings of the Conf. on Communications, Seattle, vol. 2, pp. 998–1002 (1995).

English translation of FR 2,751,815.

* cited by examiner

*Primary Examiner*—Stephen Chin
*Assistant Examiner*—Dac V. Ha
(74) *Attorney, Agent, or Firm*—Baker Botts LLP

(57) ABSTRACT

In the Global System for Mobile Communication (GSM), an improvement in estimating the channel impulse response (CIR) is obtained by starting up two channel estimators using the midamble and obtaining channel estimations with split burst. The two estimations are then cross-correlated to obtain the estimated CIR.

11 Claims, 2 Drawing Sheets

DUAL DIRECTION CHANNEL ESTIMATOR

CROSS REFERENCE TO RELATED APPLICATIONS

This application is a continuation of International Application No. PCT/GB99/01589 which was filed on May 19, 1999 and which published in English on Nov. 25, 1999, which in turn claims priority from United Kingdom Application Number 9810686.7, which was filed on May 19, 1998.

The present invention relates to a method for improving the working of mobile telephone communications particularly in the Global System for Mobile Communication (GSM).

GSM is a digital system which will give a higher quality of service than analogue systems and has a higher capacity for users than in an analogue system.

In GSM the communication has a burst structure and it is necessary to estimate the channel impulse response (CIR). There is a problem in estimating the CIR in the current GSM system. In the current GSM equaliser, the overall channel impulse response (CIR) is estimated by cross-correlating the received signals in the midamble portion with the known midamble sequence. Based on the assumption of a static channel during the time slot, the estimated CIR taps are used throughout the entire burst. It has found that the performance of the current channel estimation techniques suffers at least 2 dB degradation when compared with the benchmark, defined as the performance when ideal CIR taps are available at the equaliser.

The degradation can easily be seen with the following example. If a car is travelling at 120 kilometres per hour, its Doppler frequency shift will be about 100 Hz at the current radio frequency. The period of the Doppler frequency is 10 ms. On the other hand, the GSM burst is about 0.577 ms, thus it takes about one-eighth the half Doppler frequency period. Future personal land mobile telecommunication systems (IMT-2000)/UMTS) will use 2 GHz, so the Doppler frequency shift will be 220 Hz at 120 kilometres per hour. This means that during the burst the fading could vary from nearly maximum to minimum. Therefore, the assumption of a (quasi) channel is not true and tracking the CIR estimation during the data mode will be compulsory.

SUMMARY OF THE INVENTION

We have devised a system for reducing or overcoming this problem.

According to the invention there is provided a method for estimating the CIR in GSM a system in which method two channel estimators are started up using the midamble and channel estimations are obtained by channel estimators using the midamble with split burst, the two estimations are then cross-correlated to obtain the estimated CIR.

In an alternative embodiment of the invention an unbiased estimation method can be used in place of a cross-correlator to obtain the CIR.

The current channel estimation method can be used to fast start-up the two channel estimators and RLS algorithms can be used to track the changes of the channel and update the CIR during the data mode.

DETAILED DESCRIPTION OF THE PREFERRED EMBODIMENTS

Figure 1:
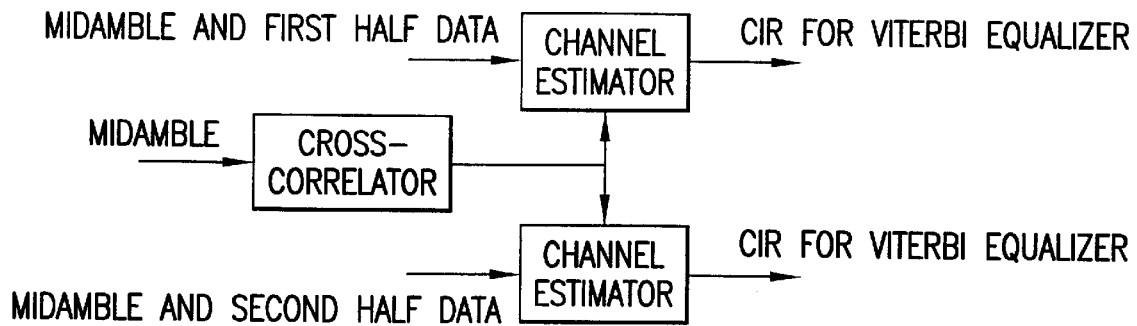
FIG. 1 is a block diagram of a method for estimating channel impulse response according to the invention.

A block diagram of the method of the present invention is shown in FIG. 1.

In carrying out the method of the present invention preferably firstly the midamble is used to start-up both channel estimators and secondly channel estimations are obtained by channel estimators using midamble with split burst.

By using split burst, full advantage can be taken of the cross-correlator and this reduces the delay introduced by the channel estimators. The re-use of midamble in both channels can reduce or overcome the inaccuracy from the cross-correlator under Gaussian noise and co-channel interference.

To maximise the transmission rate of useful data over the burst, preferably an estimate of the sampled CIR is needed in the shortest time, with the shorter the time the better the transmission rate, preferably therefore an optimum estimation process is used together with training signal to enable a best estimate of the CIR to be obtained.

When an unbiased estimation method is used instead of cross-correlation method the description of the algorithm of the unbiased channel estimator is given by:

$$R_i = H_k S + N_i \qquad (2)$$

$$R_i S^{-1} = H_k + N_i S^{-1} \qquad (3)$$

$$E[N_i S^{-1}] = 0 \qquad (4)$$

Thus $$H_k = R_i S^{-1} \qquad (5)$$

where $H_k$ is an m-component row vector which represents the CIR, $H_k$ is an m-component row vector which represents the optimum estimate of CIR, S is an m by m clement matrix of transmitted signals and $R_i$ is an m-component row vector of received signals. $N_i$ is an m-component row vector of additive white Gaussian noise.

If we can get the inverse matrix of S, an unbiased linear estimate of $H_k$ will be obtained. Because $H_k S = R_i$, the estimated $H_k$ maximises its likelihood function $P(R_i/H_k)$ and minimises $E|H_k S - H_k S|^2$. Thus $H_k$ is also the maximum likelihood estimate of $H_k$ from $R_i$.

This method will use fewer bits than the cross-correlation method for the same CIR length. The extra bits in the midamble can be used for further channel estimation. Better channel estimation can be expected by averaging these two estimations. This method only needs to choose another sequence in midamble and requires no further modification in GSM system.

An embodiment of the proposed channel estimator of the present invention is described as follows:

For the proposed channel estimator the cross-correlation estimation or unbiased channel estimation is used to fast start-up the transversal filter channel estimator which is used during the data mode in the channel estimator. The midamble will go through the channel estimator again to train the channel estimator. This double use of the midamble guarantees the convergence of the channel estimator. This method is an optimum estimation process and solves the convergence speed problem of channel estimators. Dual direction channel estimation can reduce the process delay to half and reusing the midamble will take full advantage of the known sequence.

Figure 2:
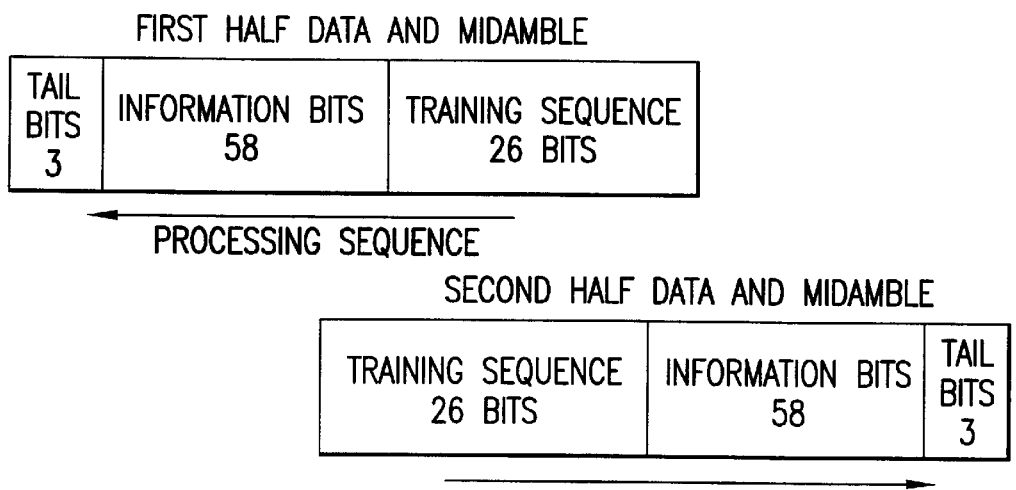
FIG. 2 is a block diagram illustration of two channel estimators in accordance with the invention.

This is illustrated in FIG. 2.

Use of Transversal Filter Channel Estimator

Figure 3:
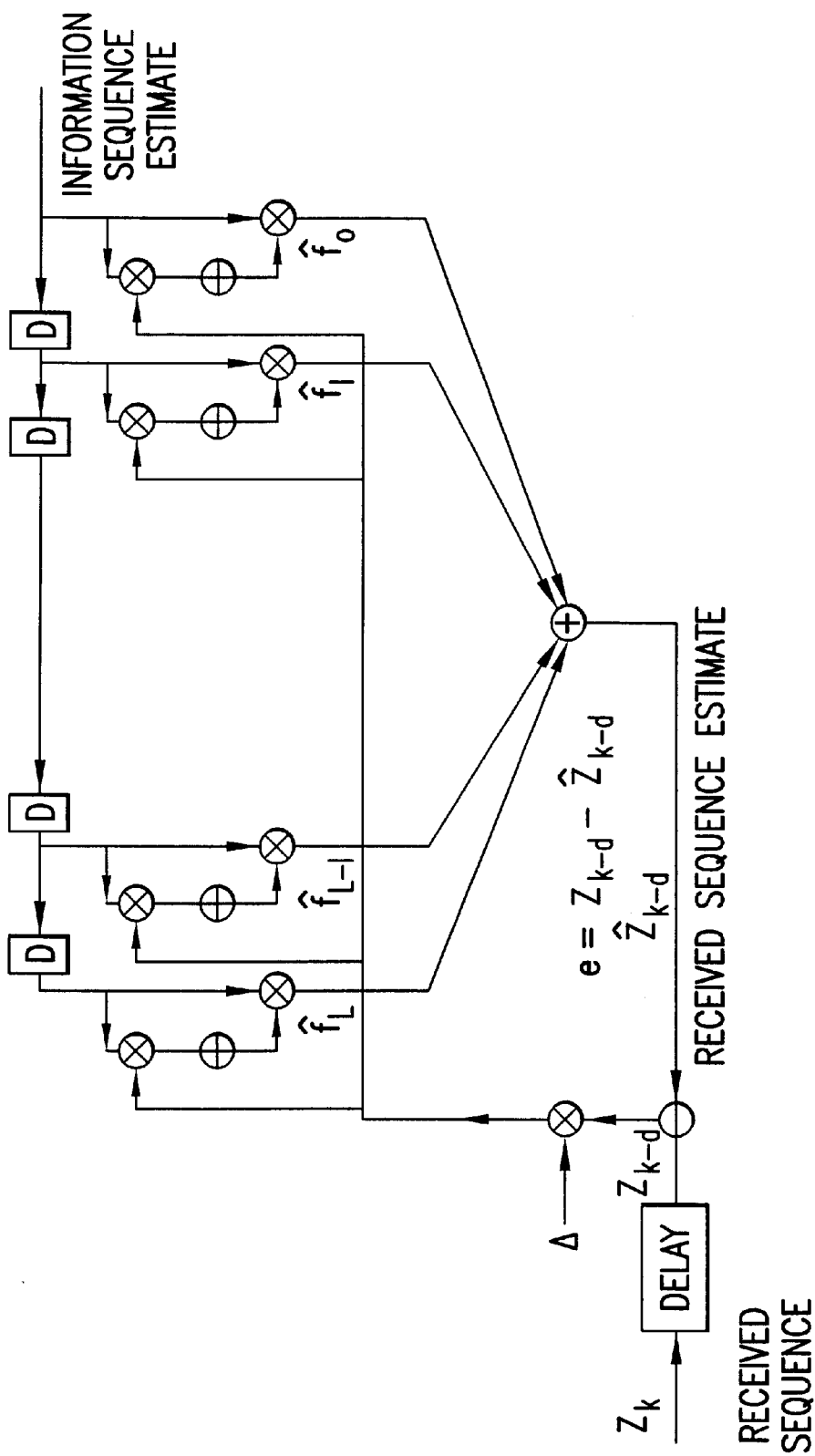
FIG. 3 is an illustration of arrangement of a channel estimator using LMS or Kalman algorithm in accordance with the invention.

During data mode, there could be some errors in the decisions, therefore use of an unbiased estimation or cross-correlating method could give rise to difficulties. To overcome this a transversal filter channel estimator can be used during the data mode the proposed channel estimator and the structure of the LMS channel estimator is shown in FIG. 3.

For the proposed channel estimator, tentative soft decisions can be used in order to use more reliable decisions $S(k)=\{S_{k-n}, S_{k-n+1}, \ldots S_{k-1}, S_k\}^T$ So S(k) now is not only time dependent but also tentative soft decision dependent because of the channel estimate. The channel parameters $h_j$ can be estimated by using the LMS or Kalman algorithm.

The channel estimator may introduce some delays depending on the structure, therefore the estimate of CIR is a delayed estimate and a predicted CIR is needed. The longer the delay before using a soft decision, the more reliable that decision is for the channel estimator. However, if decisions with longer delays are used, prediction with more than one step will be required.

The least-square fading memory prediction can be used for fast changing channels. The equations are given by $$E_i = H_i - H_{i,i-1} \tag{6}$$

$$H'_{i-1,i} = H'_{i,i-1} + (1-\theta)^2 E_i \tag{7}$$

$$H_{i-1,i} = H_{i,i-1} + H_{i-1,i} + (1-\theta^2) E_i \tag{8}$$

$$H_{i-2,i} = H_{i,i+1} + H'_{i-1,i} \tag{9}$$

where $H'_{i+1}$ means one step prediction of the first derivative $H'_{i-1}$, and 0 is a real-valued constant in the range 0 to 1. The bigger the value of 0, the greater the number of estimates that are effectively involved in a prediction.

The method of the invention enables better channel estimation can be obtained and the degradation in current systems can be overcome.

What is claimed is:

1. A method for estimating channel impulse response in a global system for mobile communication comprising:
   providing a midamble portion and sub-burst portions of a data signal,
   starting up two channel estimators using the midamble portion,
   obtaining an estimation from each of the channel estimators using the midamble and sub-burst portions, and
   processing the estimations using an unbiased estimation method to obtain a channel impulse response estimate.

2. A method as claimed in claim 1 comprising cross-correlating the two estimations to obtain the estimated channel impulse response.

3. A method as claimed in claim 1 comprising starting up the two channel estimators and using a channel estimation method and the midamble portion.

4. A method as claimed in claim 3 wherein RLS algorithms are used to track changes of each channel and update the channel impulse response estimate.

5. A method as claimed in claim 1 comprising processing the two estimations using an optimum estimation process together with a training signal.

6. A method as claimed in claim 1 comprising processing the two estimates using an optimum estimation process together with a training signal.

7. A method as claimed in claim 1 wherein each channel estimator includes a tranverse filter channel estimator and comprising starting up the transverse filter channel estimator using one selected form the group consisting of cross-correlation estimation and unbiased estimation and the midamble, and further comprising using the midamble to train the channel estimator.

8. A method as claimed in claim 1 wherein each channel estimator includes a transversal filter channel estimator and comprising starting up the transverse filter channel estimator using one selected form the group consisting of cross-correlation estimation and unbiased estimation and the midamble, and further comprising using the midamble to the channel estimator.

9. A method as claimed in claim 1 wherein each channel estimator includes a transversal filter channel estimator.

10. A method as claimed in claim 1 further comprising using least square finding memory prediction for fast changing channels.

11. A method for estimating channel impulse response in a global system for mobile communication comprising:
   providing a midamble portion and sub-burst portions of a data signal,
   starting up two channel estimators using the midamble portion,
   obtaining an estimation from each of the channel estimators using the midamble and sub-burst portions, starting the estimation using an unbiased estimation method to obtain an initial channel impulse response estimate, wherein the unbiased estimation method defines a plurality of modulated data symbols, and
   processing the estimation with an adaptive algorithm for each of the plurality of modulated data symbols.

* * * * *